US012786649B2

(12) United States Patent
Inagaki et al.

(10) Patent No.: US 12,786,649 B2
(45) Date of Patent: Nov. 3, 2026

(54) METHOD OF MANUFACTURING SPEAKER DIAPHRAGM, SPEAKER DIAPHRAGM, AND SPEAKER

(71) Applicant: JVCKENWOOD Corporation, Yokohama (JP)

(72) Inventors: Kazuyuki Inagaki, Yokohama (JP); Kazushi Kuroyanagi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 146 days.

(21) Appl. No.: 18/791,742

(22) Filed: Aug. 1, 2024

(65) Prior Publication Data

US 2024/0422492 A1 Dec. 19, 2024

Related U.S. Application Data

(63) Continuation of application No. PCT/JP2023/001389, filed on Jan. 18, 2023.

(30) Foreign Application Priority Data

Mar. 3, 2022 (JP) ................................ 2022-032480

(51) Int. Cl.
*H04R 31/00* (2006.01)
*H04R 7/12* (2006.01)

(52) U.S. Cl.
CPC ........... *H04R 31/003* (2013.01); *H04R 7/125* (2013.01); *H04R 2307/025* (2013.01); *H04R 2307/027* (2013.01)

(58) Field of Classification Search
CPC ... H04R 2307/02; H04R 7/125; H04R 31/003
See application file for complete search history.

(56) References Cited

U.S. PATENT DOCUMENTS 7,443,998 B2 * 10/2008 Hachiya ................ H04R 7/125 428/297.4
2006/0269094 A1 11/2006 Kato

FOREIGN PATENT DOCUMENTS

JP 2006-339736 A 12/2006
WO WO-2014162472 A1 * 10/2014 ............ H04R 7/125

* cited by examiner

*Primary Examiner* — Sunita Joshi
(74) *Attorney, Agent, or Firm* — PROCOPIO, CORY, HARGREAVES & SAVITCH LLP

(57) ABSTRACT

A method of manufacturing a speaker diaphragm having a conductive layer and resin layers arranged to interpose the conductive layer is provided. The method includes: a first step of providing a through hole for causing a tinsel wire to pass through a conductive layer; and a second step of closing a mold, in which a punch having a diameter smaller than a diameter of the through hole is provided in each of first and second molds, to cause the punches to press the resin layers on an inside of the through hole with respect to a laminated body in which the resin layers are arranged on both surfaces of the conductive layer. In the second step, leaked material of the resin layers flows in an inner side surface direction of the through hole by pressing into a gap portion near outer surfaces of the punches.

2 Claims, 13 Drawing Sheets

METHOD OF MANUFACTURING SPEAKER DIAPHRAGM, SPEAKER DIAPHRAGM, AND SPEAKER

CROSS REFERENCE TO RELATED APPLICATION

This application is based upon and claims the benefit of priority from Japanese patent application No. 2022-032480, filed on Mar. 3, 2022, and International patent application No. PCT/JP2023/001389, filed on Jan. 18, 2023, the disclosure of which is incorporated herein in their entirety by reference.

BACKGROUND

The present disclosure relates to a method of manufacturing a speaker diaphragm, a speaker diaphragm, and a speaker.

A manufacturing technique has been developed in which a tinsel wire is caused to pass through a speaker diaphragm.

In a manufacturing method disclosed in Japanese Unexamined Patent Application Publication No. 2006-339736, for a speaker diaphragm made of metal, a tinsel wire is inserted through a through hole provided in a damper. In this case, a connection portion between the tinsel wire and a voice coil is arranged on an outer peripheral surface of a voice coil bobbin.

SUMMARY

In Japanese Unexamined Patent Application Publication No. 2006-339736 described above, insulation between a speaker diaphragm made of metal and having conductivity and a tinsel wire can be secured, but a common manufacturing technique of causing a tinsel wire hole to pass through the speaker diaphragm cannot be applied. In this case, there is a problem that a separate component for securing insulation is needed, a large hole in consideration of a thickness of the separate component is opened, and due to that, rigidity of the speaker diaphragm becomes insufficient.

The present disclosure has been made in consideration of such a circumstance, and an object thereof is to provide a method of manufacturing a speaker diaphragm, a speaker diaphragm, and a speaker that can secure insulation even when a hole is made in the speaker diaphragm and can also secure rigidity thereof.

A method of manufacturing a speaker diaphragm according to the present embodiment is a method of manufacturing a speaker diaphragm, the speaker diaphragm having a conductive layer and resin layers arranged so that the conductive layer is interposed between the resin layers, the method including:

a first step of providing, in the conductive layer, a through hole for causing a tinsel wire to pass through the conductive layer;

a second step of closing a mold, in which a protruding punch having a diameter smaller than a diameter of the through hole is provided in each of a first mold and a second mold, and of causing, by the closing, the protruding punches to press the resin layers on an inside of the through hole with respect to a laminated body in which the resin layers are respectively arranged on both surfaces of the conductive layer, in which in the second step, leaked material of the resin layers flows in an inner side surface direction of the through hole by pressing of the protruding punches and flows into a gap portion in a vicinity of outer side surfaces of the protruding punches.

A method of manufacturing a speaker diaphragm according to the present embodiment is a method of manufacturing a speaker diaphragm, the speaker diaphragm having a conductive layer and resin layers arranged so that the conductive layer is interposed between the resin layers, the method including:

a first step of providing, in the conductive layer, a through hole for causing a tinsel wire to pass through the conductive layer;

a second step of closing a mold, in which a recess having a diameter larger than a diameter of the through hole is provided in each of a first mold and a second mold, and of pressing, by the closing, the resin layers on an outside of the through hole with respect to a laminated body in which the resin layers are respectively arranged on both surfaces of the conductive layer; and a third step of pressurizing a space formed by joining of the recesses of the mold in the second step, in which in the third step, the resin layers are pressurized and fused together on an inside of the through hole.

A speaker diaphragm according to the present embodiment is a speaker diaphragm having a through hole through which a tinsel wire is to be inserted, the speaker diaphragm including:

a conductive layer having the through hole; and resin layers between which both surfaces of the conductive layer are interposed and which cover an inner side surface of the through hole, in which a part of the resin layers which covers an inner side surface of the through hole is formed by causing a part of the resin layers, which is positioned around a center of the through hole before a pressing process of pressing a portion around the center of the through hole in the resin layers from the both surfaces of the conductive layer, to flows in an inner side surface direction of the through hole by the pressing process.

A speaker according to the present embodiment is a speaker including the speaker diaphragm.

DETAILED DESCRIPTION

Figure 1:
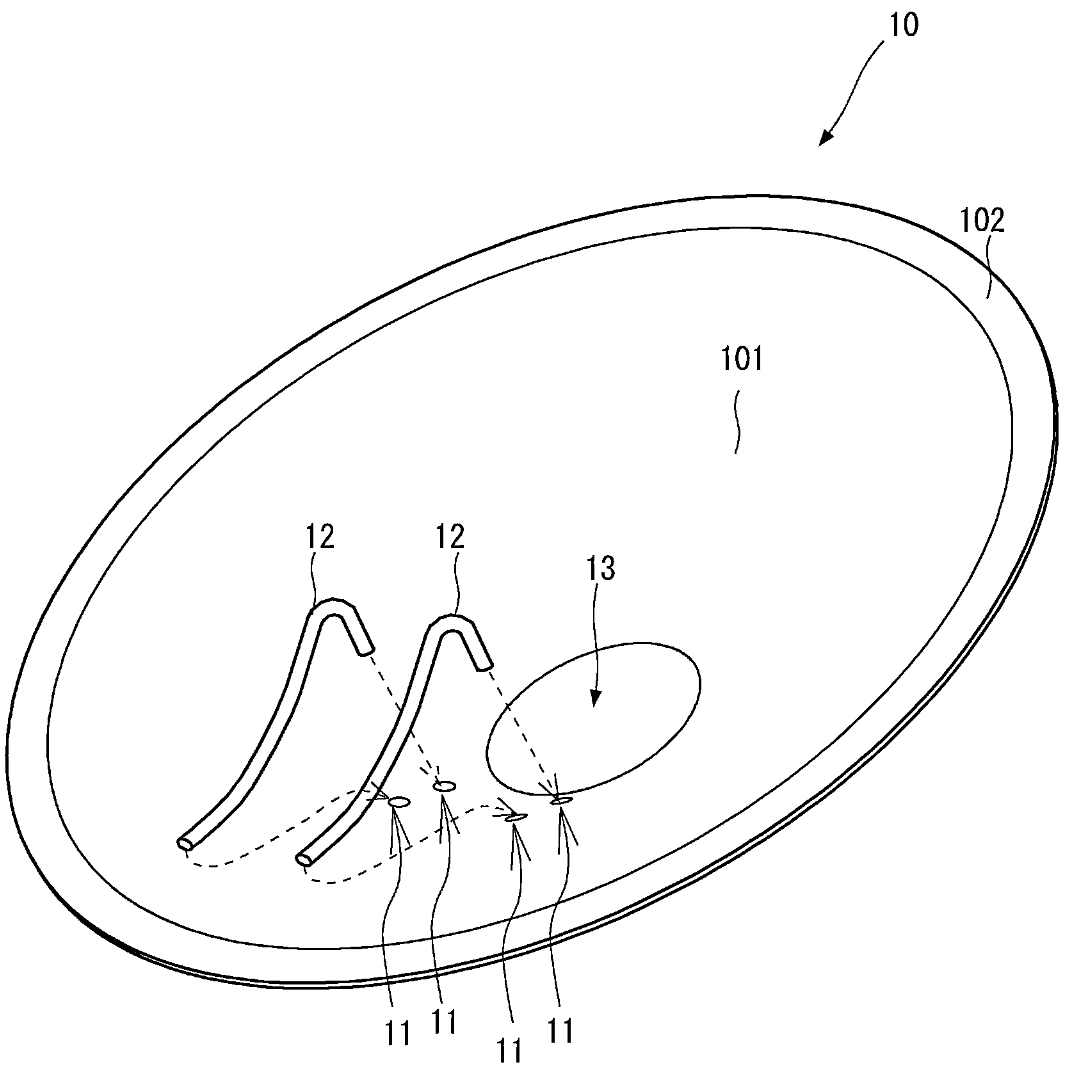
FIG. 1 is a perspective view of a speaker diaphragm 10 which is shaped by using a method of manufacturing a speaker diaphragm according to a first embodiment.

Embodiments of the present disclosure will hereinafter be described with reference to drawings. In the drawings, the same reference characters will be given to the same or corresponding elements, and repetitions of descriptions thereof will be skipped as needed for the purpose of clarifying the descriptions. Further, several reference characters are not indicated so that the drawings do not become complicated.

Note that it goes without saying that an xyz orthogonal coordinates of a right-handed system which are illustrated in the drawings are for convenience of describing positional relationships among configuration elements. Usually, a z-axis positive direction is a perpendicularly upward direction, and an xy plane is a horizontal plane.

First Embodiment

<Configuration of Shaped Speaker Diaphragm>

First, a description will be made about a speaker diaphragm which is shaped by using a method of manufacturing a speaker diaphragm according to a first embodiment with reference to FIG. 1 and FIG. 2.

FIG. 1 is a perspective view of a speaker diaphragm 10 which is shaped by using the method of manufacturing a speaker diaphragm according to the first embodiment. As illustrated in FIG. 1, the speaker diaphragm 10 includes a curved surface 101, an edge portion 102, and tinsel wire holes 11.

The curved surface 101 has a recessed shape in a direction from an outer periphery to a center. Further, in the curved surface 101, a hollow hole 13 is provided in the center of the curved surface 101, and the tinsel wire holes 11 are provided in the curved surface 101. A tinsel wire 12 is caused to pass through the tinsel wire hole 11. In FIG. 1, four tinsel wire holes 11 are provided, but the number of tinsel wire holes is not limited to four and may be two.

The edge portion 102 is provided on an outer side along the outer periphery of the curved surface 101 in a plane which is vertical to a normal direction passing through a center of the hole 13.

In the speaker diaphragm 10, the curved surface 101 vibrates while the edge portion 102 is set as a fixed end.

In the following, a field of view in which the curved surface 101 is recessed when seen in a normal direction of the hollow hole 13 of the speaker diaphragm 10 will be set as a top view. Further, a field of view which is seen in a vertical direction to the normal direction of the hollow hole 13 of the speaker diaphragm 10 will be referred to as a cross-sectional view.

Figure 2:
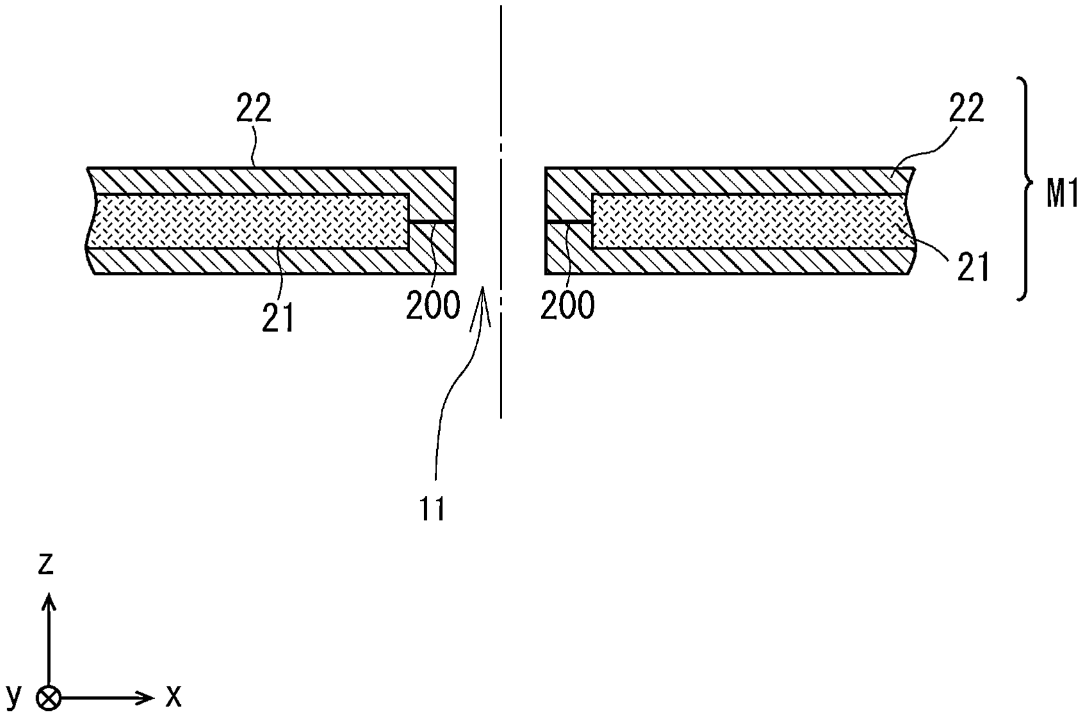
FIG. 2 is a cross-sectional view of a tinsel wire hole 11 in a curved surface 101 of the speaker diaphragm 10 shaped by using the method of manufacturing a speaker diaphragm according to the first embodiment.

FIG. 2 is a cross-sectional view which passes through the tinsel wire hole 11 in the curved surface 101 of the speaker diaphragm 10 shaped by using the method of manufacturing a speaker diaphragm according to the first embodiment. As illustrated in FIG. 2, the speaker diaphragm 10 according to the first embodiment has a conductive layer 21 and resin layers 22. The resin layers 22 are arranged so that the conductive layer 21 is interposed therebetween, and fusing surfaces 200 are fused together. That is, the resin layers 22 in the speaker diaphragm 10 according to the first embodiment are arranged so as to envelop the conductive layer 21. A laminated body in which the resin layers 22 are respectively arranged on both surfaces of the conductive layer 21 will be denoted as a laminated body M1. The resin layer 22 is a polypropylene sheet of 5, 10, or 15 μm, for example. Further, it is preferable that a thickness of the speaker diaphragm 10 be 200 μm or smaller or 100 μm or smaller.

Here, the conductive layer 21 is a conductor and is thus electrically energizable, but the resin layer 22 is a non-conductor and is thus not electrically energizable. Even when the tinsel wire is caused to pass through the tinsel wire hole 11, because only the resin layers 22 contact with the tinsel wire, the speaker diaphragm shaped by using the method of manufacturing a speaker diaphragm according to the first embodiment is not short-circuited.

<Method of Manufacturing Speaker Diaphragm>

Figure 3:
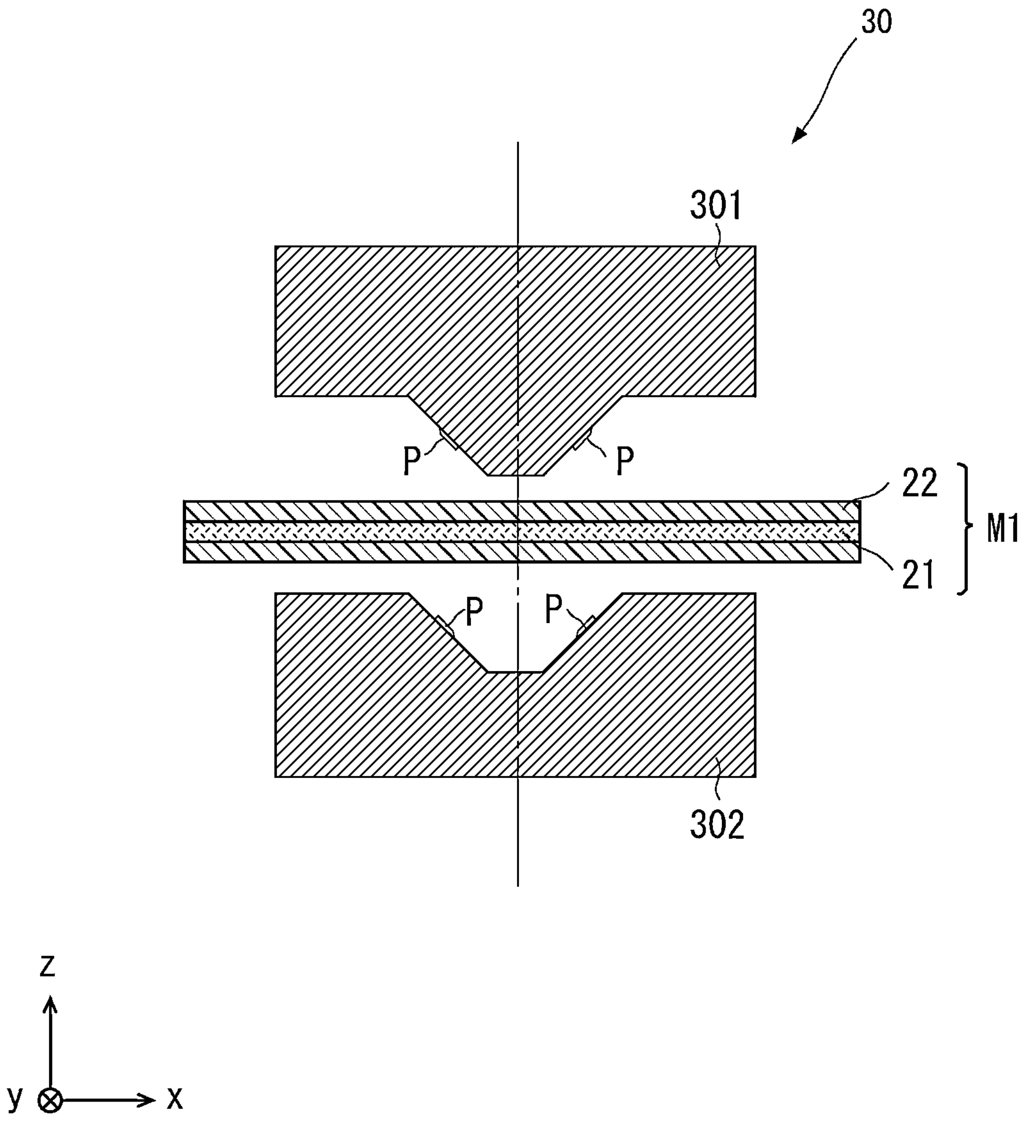
FIG. 3 is a schematic view of a mold which is used in the method of manufacturing a speaker diaphragm according to the first embodiment.
Figure 4:
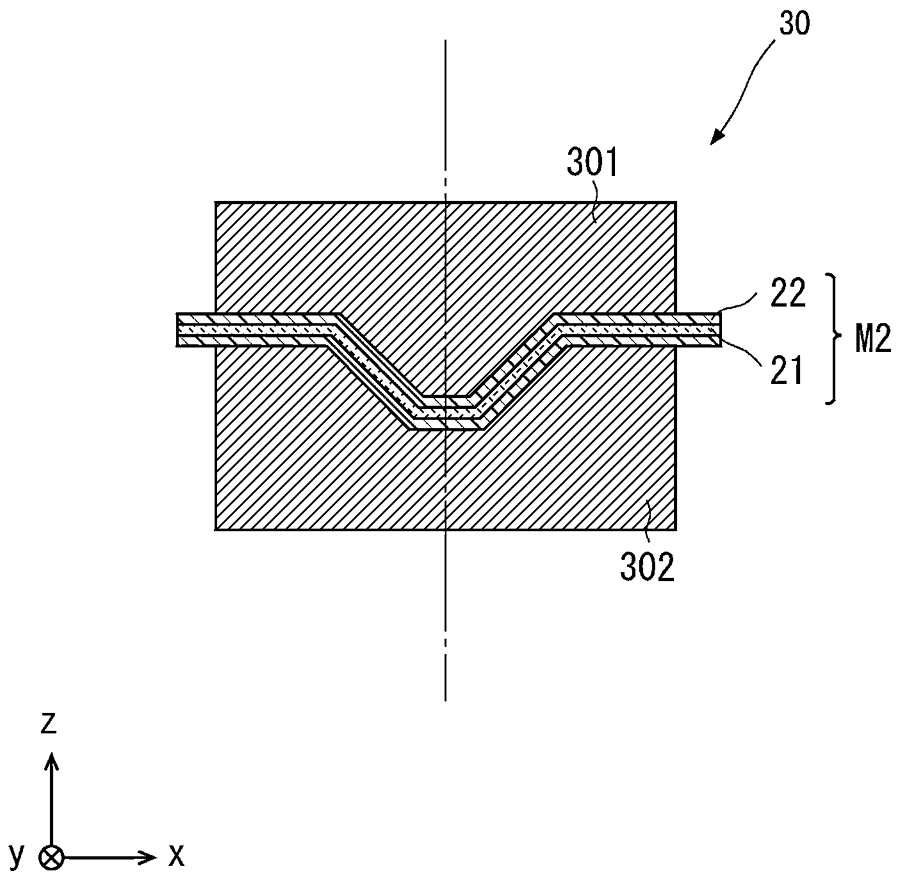
FIG. 4 is a schematic view of the mold which is used in the method of manufacturing a speaker diaphragm according to the first embodiment.

FIG. 3 and FIG. 4 are schematic views of a mold which is used in the method of manufacturing a speaker diaphragm according to the first embodiment. A description will be made about a mold 30, which is used in the method of manufacturing a speaker diaphragm according to the first embodiment, with reference to FIG. 3 and FIG. 4.

As illustrated in FIG. 3, the mold 30 includes a pair of movable molds 301 and 302 which are capable of being opened and closed. A movable direction of the movable molds 301 and 302 in FIG. 3 is a direction parallel with a Z axis. Each of the movable mold 301 and the movable mold 302 includes protruding punches P. The punches P are provided to be linearly symmetric with respect to a center line which is parallel with the movable direction of the movable mold 301 and the movable mold 302. Further, the punch P has a shape that has a diameter smaller than a diameter of a through hole 31 which will be described later. Here, the punches P may be provided only on one side with respect to the center line which is parallel with the movable direction of the movable mold 301 and the movable mold 302.

The laminated body M1 is placed in the mold 30. In this case, the through holes 31 of the speaker diaphragm 10 are arranged so as to be pressed by the punches P of the mold 30. Because FIG. 3 illustrates the cross-sectional view of the speaker diaphragm 10, FIG. 3 does not illustrate the through holes 31.

As illustrated in FIG. 4, the pair of movable molds 301 and 302 are closed, and the laminated body M1 is thereby pressed. The pair of movable molds 301 and 302 are opened, and a laminated body M2 whose shape has been formed is taken out.

Note that one of the movable molds 301 and 302 may be a fixed mold.

In addition, the movable mold 301 will be referred to as a first mold, and the movable mold 302 will be referred to as a second mold. The movable mold 301 may be used as a second mold, and the movable mold 302 may be used as a first mold.

In the movable mold 301 and the movable mold 302 in FIG. 4, the punches P are not illustrated for convenience of description.

Figure 5:
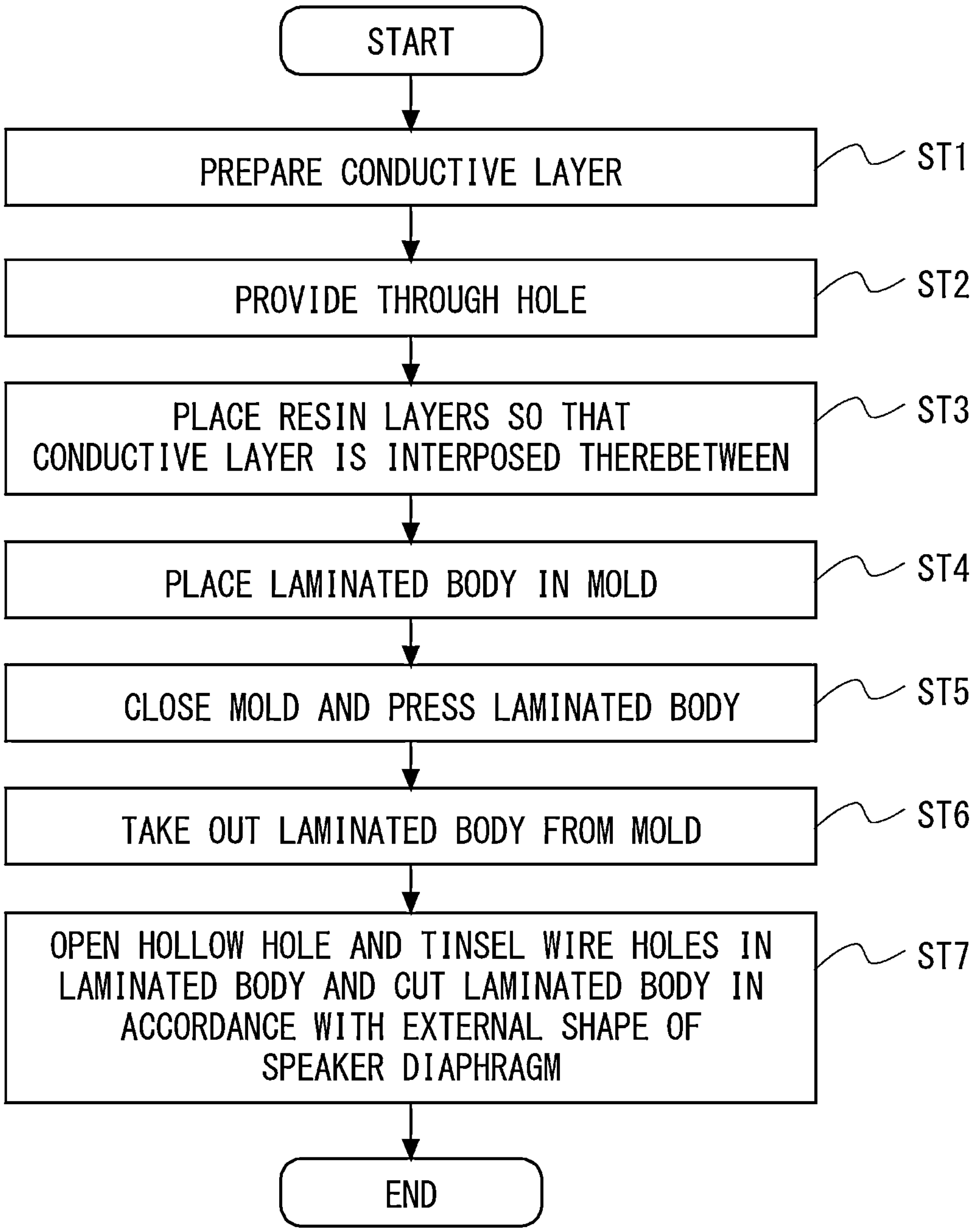
FIG. 5 is a flowchart illustrating the method of manufacturing a speaker diaphragm according to the first embodiment.
Figure 6:
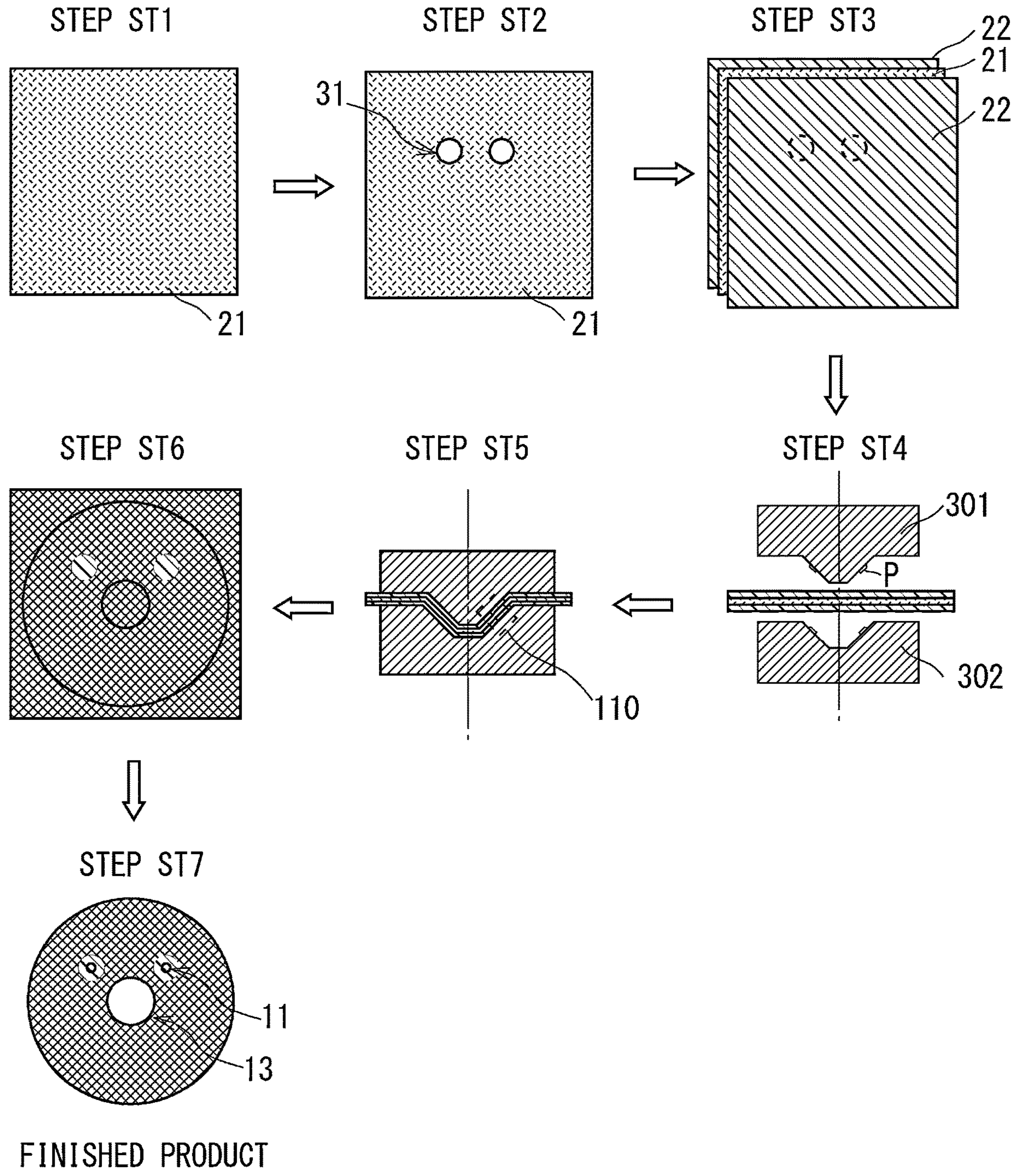
FIG. 6 is a diagram illustrating the method of manufacturing a speaker diaphragm according to the first embodiment.

Next, a description will be made about the method of manufacturing a speaker diaphragm according to the first embodiment with reference to FIG. 5 and FIG. 6. FIG. 5 is a flowchart illustrating the method of manufacturing a speaker diaphragm according to the first embodiment. FIG. 6 is a schematic view illustrating the method of manufacturing a speaker diaphragm according to the first embodiment. Note that FIG. 6 illustrates an example where two tinsel wire holes 11 of the speaker diaphragm are provided.

In FIG. 6, step ST1 to step ST3 and step ST6 to step ST7 are in the top view of the speaker diaphragm 10, and step ST4 and step ST5 are in the cross-sectional view of the speaker diaphragm 10.

First, the conductive layer 21 is prepared (step ST1). In this case, the conductive layer 21 in FIG. 6 has a generally square shape but may have a circular shape.

Next, the through hole 31 having a diameter larger than a diameter of the tinsel wire is provided in the conductive layer 21 (step ST2). Note that the through hole 31 is formed by a punching tool, machining, or the like, for example. Next, the resin layers 22 are placed so that the conductive layer 21 is interposed therebetween, and the laminated body M1 is thereby configured (step ST3). In this case, the resin layer 22 in FIG. 6 has a generally square shape but may have a circular shape. Further, it is preferable that the shape of the conductive layer 21 be the same shape as that of the resin layer 22.

Here, the laminated body M1 prepared in step ST3 is placed in the mold 30 (step ST4). In this case, the through holes 31 of the speaker diaphragm 10 are arranged so as to be pressed by the punches P of the mold 30. Pressing is performed by closing the movable molds 301 and 302 (step ST5). The laminated body M2 whose shape is formed is taken out (step ST6), the tinsel wire holes 11 are formed on insides of the through holes 31 in the laminated body M2, and the hole 13 is further formed in the laminated body M2. The laminated body M2 is then cut into a circular shape in accordance with an external shape of the speaker diaphragm, and the speaker diaphragm 10 is thereby made (step ST7). In this case, it goes without saying that the tinsel wire hole 11 is a hole which has a smaller diameter than the diameter of the through hole 31.

Figure 7:
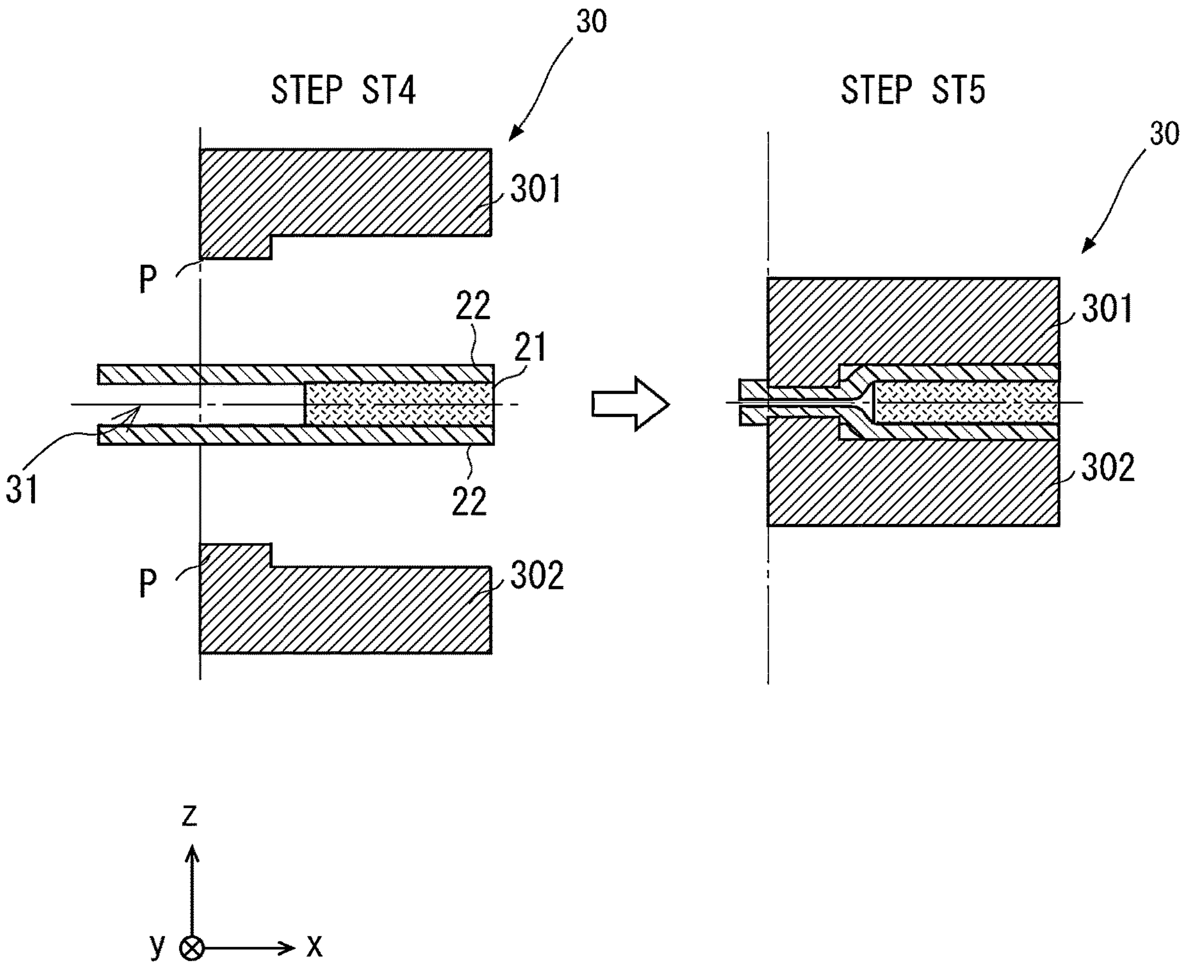
FIG. 7 is an enlarged view of a mold 30 in the method of manufacturing a speaker diaphragm according to the first embodiment.

FIG. 7 is an enlarged view of the mold 30 in the method of manufacturing a speaker diaphragm according to the first embodiment. Further, FIG. 7 is the enlarged view which corresponds to a section 110 of the mold 30 illustrated in FIG. 6. In the following, step ST4 and step ST5 will be described in detail.

The laminated body M1 formed with the conductive layer 21 and the resin layers 22 is placed in the mold 30. The laminated body M1 and the mold 30 are arranged so that centers of the through holes 31 provided in the conductive layer 21 are aligned with centers of the punches P provided in the mold 30 (step ST4). When the pair of movable molds 301 and 302 in the mold 30 are moved and closed in directions in which those approach each other, the laminated body M1 is interposed between the movable molds 301 and 302 and pressed (step ST5). The movable mold 301 includes the punches P on protrusions. Thus, the punches P press the resin layers 22 on the inside of the through hole 31. A distance in an up-down direction (Z-axis direction) between the punch P of the movable mold 301 and the punch P of the movable mold 302 at a time after pressing is completed is set smaller than a plate thickness (the thickness in the Z-axis direction) of two resin layers 22. Accordingly, the punches P strongly fuse the upper and lower resin layers 22 together.

On the other hand, an outer side of the through hole 31, that is, each of the resin layers 22 between which the conductive layer 21 is interposed is pressed by the mold 30 and thereby has a thin thickness. In this case, the resin layer 22 juts out to the conductive layer 21, and the thickness of the resin layer 22 becomes slightly thinner.

Figure 8:
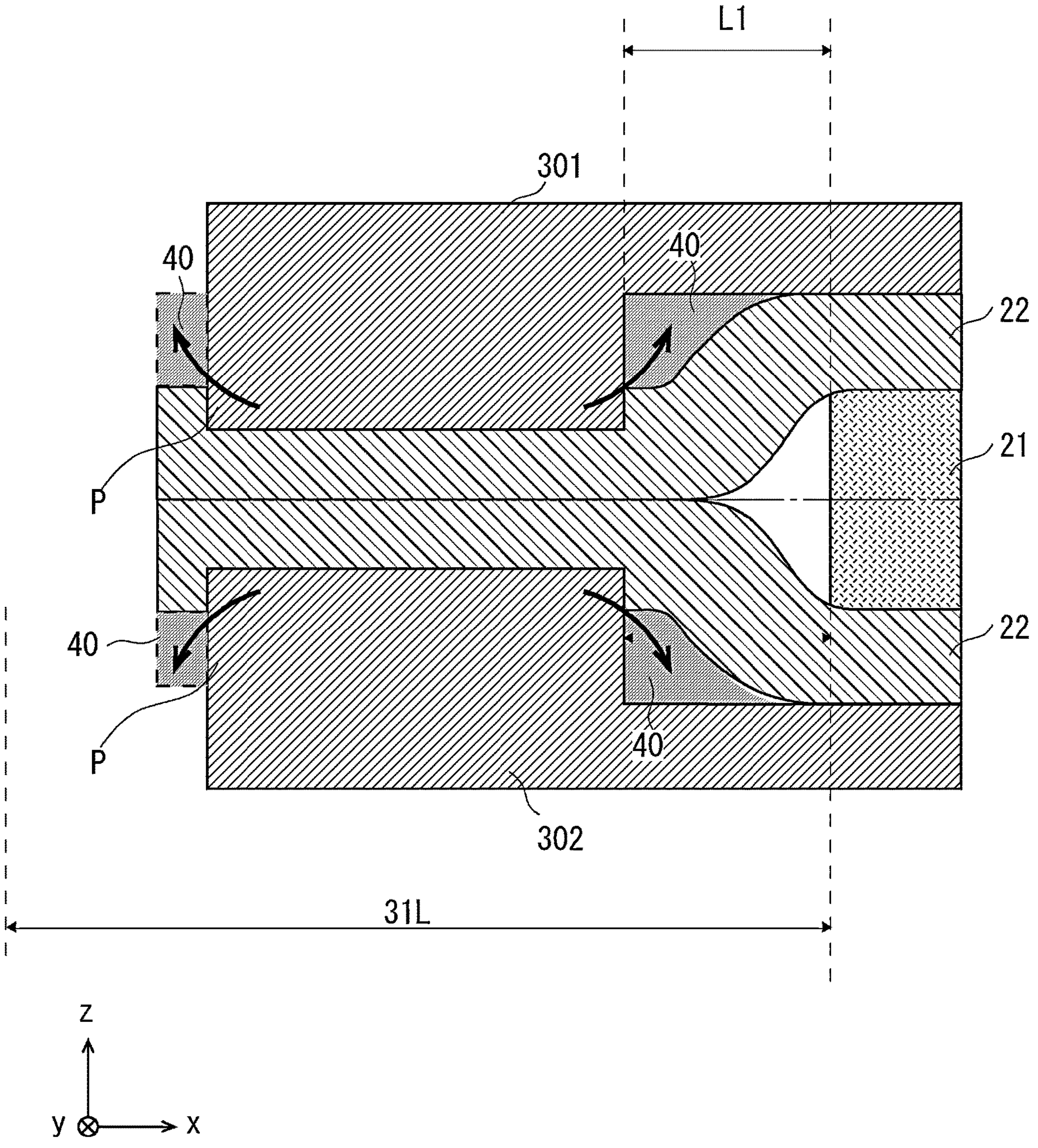
FIG. 8 is an enlarged view of a case where punches P press resin layers 22 on an inside of a through hole 31 by the method of manufacturing a speaker diaphragm according to the first embodiment.

FIG. 8 is an enlarged view of a case where the punches P press the resin layers 22 on the inside of the through hole 31 by the method of manufacturing a speaker diaphragm according to the first embodiment. For convenience of description, a part of the through hole 31 in FIG. 8 is not illustrated.

The resin layers 22 are pressed by the punches P. In this case, a diameter of the punch P is smaller than a diameter 31L of the through hole 31. That is, as illustrated in FIG. 8, the punches P and the conductive layer 21 are spaced apart in a horizontal direction (x direction) by a distance L1. On pressing, since the laminated body M1 present in the vicinity of the punches P has two layers, a level difference is formed with respect to a portion having three layers, a gap portion in the vicinity of outer side surfaces of the punches P is produced around roots of the punches P, the gap portion corresponding to a thickness difference. Thus, when the punches P press the resin layers 22 on the inside of the through hole 31, the resin layers 22 flow in an inner side surface direction of the through hole 31 and flow into the gap portion in the vicinity of the outer side surfaces of the punches P. The resin layer 22 which flows in this case will be denoted as a leaked material 40. As described above, since the leaked material 40 is produced by the method of manufacturing a speaker diaphragm according to the first embodiment, the conductive layer 21 is enveloped by the resin layers 22. As an amount of the leaked material 40 is larger, areas of the fusing surfaces 200 become larger, and insulation can easily be secured.

Further, even a two-layer portion in the vicinity of the through hole 31, which does not have the conductive layer 21, can be caused to have the same thickness as that of a three-layer portion of the laminated body M1, and rigidity of an opening can thereby be enhanced.

In the method of manufacturing a speaker diaphragm according to the present first embodiment, a step of providing the through hole 31 for causing the tinsel wire to pass through the conductive layer 21 will be referred to as a first step. A step of closing the mold 30 having the protruding punches P, each of which has the diameter smaller than the diameter of the through hole 31, and of thereby causing the punches P to press the resin layers 22 on the inside of the through hole 31 with respect to the laminated body M1 will be referred to as a second step.

As described above, by using the method of manufacturing a speaker diaphragm according to the first embodiment, even when the tinsel wire holes are made in the speaker diaphragm having conductivity, insulation can be secured, and rigidity can also be secured.

Here, a description will be made about the speaker diaphragm which is manufactured by the method of manufacturing a speaker diaphragm according to the first embodiment with reference to FIG. 2. The speaker diaphragm has the conductive layer 21 having the through holes, through which the tinsel wires are to be inserted, and the resin layers 22, between which both surfaces of the conductive layer 21 are interposed and which cover an inner side surface of the through hole. A part of the resin layers 22, which is positioned around a center of the through hole before a pressing process of pressing a portion around the center of the through hole in the resin layers 22 from both of the surfaces of the conductive layer 21, is caused to flow in the inner side surface direction of the through hole by the pressing process, and a part of the resin layers 22 which cover the inner side surface of the through hole is thereby formed.

Second Embodiment

Figure 9:
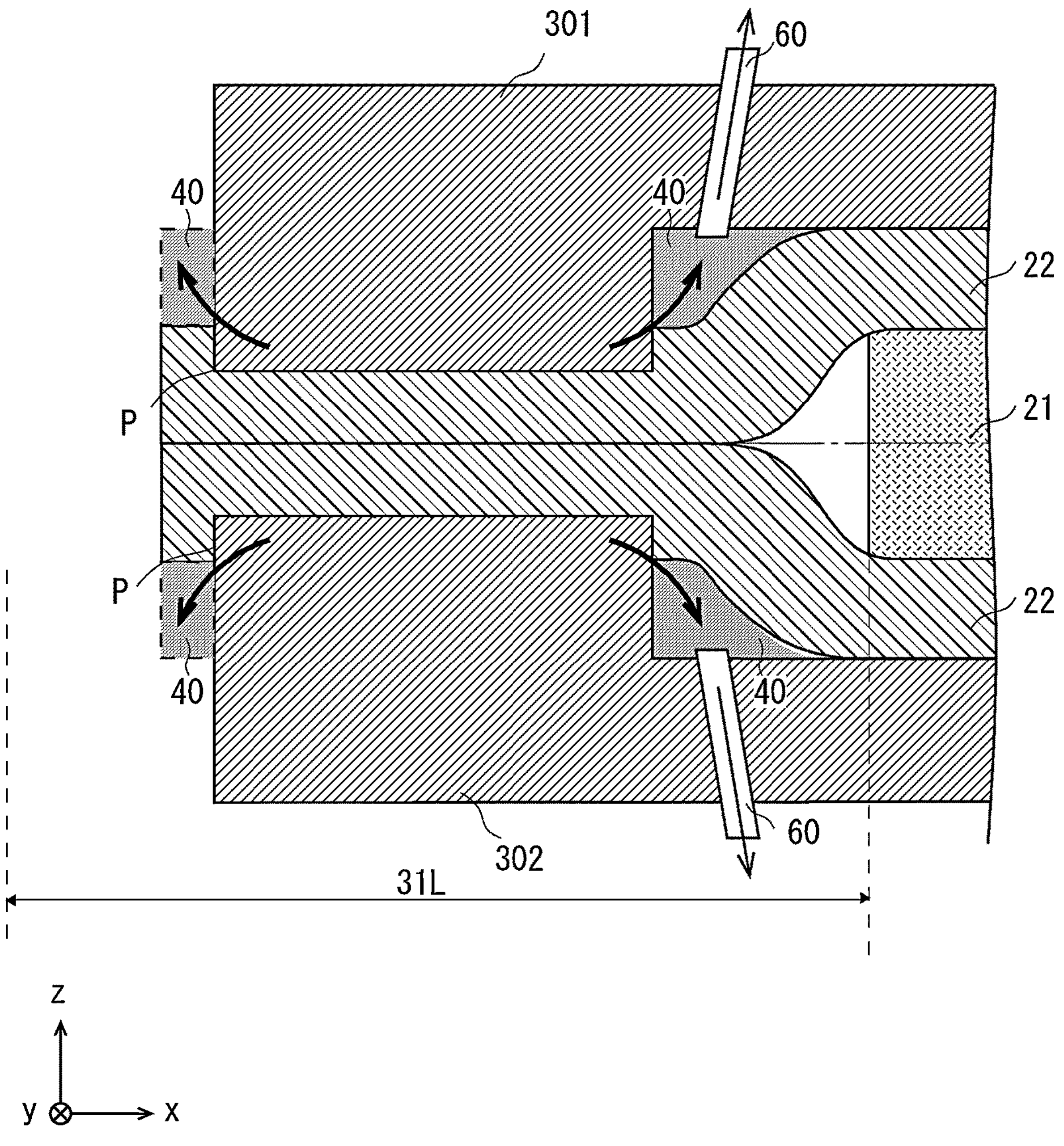
FIG. 9 is an enlarged view of a case where the punches P press the resin layers 22 on the inside of the through hole 31 by a method of manufacturing a speaker diaphragm according to a second embodiment.

A description will be made about a method of manufacturing a speaker diaphragm according to a second embodiment. FIG. 9 is an enlarged view of a case where the punches P press the resin layers 22 on the inside of the through hole 31 by the method of manufacturing a speaker diaphragm according to the second embodiment. For convenience of description, a part of the through hole 31 in FIG. 9 is not illustrated. Because the mold 30 according to the second embodiment is similar to that in the method of manufacturing a speaker diaphragm according to the first embodiment, a description about the mold 30 will not be made. Here, a pressure reduction tube 60 will be described.

The pressure reduction tubes 60 are provided in a cavity in the mold 30 in which the leaked material 40 flows, that is, a cavity between the mold 30 and the laminated body M1. Here, the pressure reduction tube 60 is connected with a pressure reduction pump (not illustrated), for example. A combination of the pressure reduction tube 60 and the pressure reduction pump will be denoted as a pressure reduction apparatus. The pressure reduction apparatus is not limited to the combination of the pressure reduction tube and the pressure reduction pump and may be piping and the pressure reduction pump or piping and a vacuum pump.

When the punches P press the resin layers 22 on the inside of the through hole 31, the leaked material 40 of the resin layers flows in the inner side surface direction of the through hole 31. In this case, at the same time as pressing by the punches P, pressure reduction is carried out by the pressure reduction apparatus. The resin layers 22 are drawn to the gap portion in the vicinity of the outer side surfaces of the punches P. As described above, the pressure reduction apparatus induces the leaked material 40 to flow in the inner side surface direction of the through hole 31.

In the method of manufacturing a speaker diaphragm according to the present second embodiment, a step of inducing the leaked material 40 to flow in the inner side surface direction of the through hole 31 will be referred to as a pressure reduction step.

As described above, by using the method of manufacturing a speaker diaphragm according to the second embodiment, the leaked material produced by the punches is induced to flow. Therefore, contact tightness between the resin layers and the mold is enhanced, and insulation and rigidity are easily secured.

Third Embodiment

Figure 10:
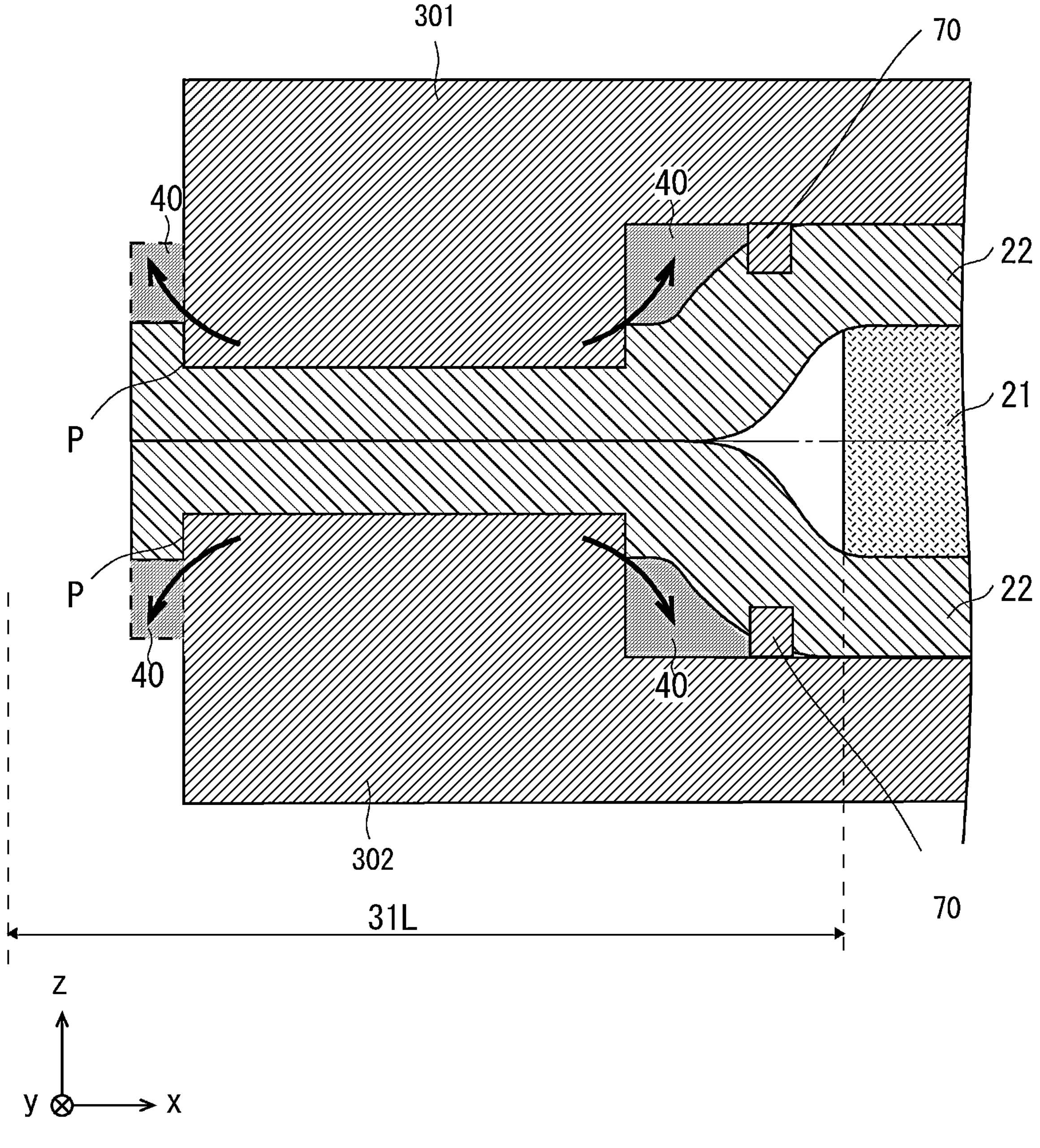
FIG. 10 is an enlarged view of a method of manufacturing a speaker diaphragm according to a third embodiment.

A description will be made about a method of manufacturing a speaker diaphragm according to a third embodiment. FIG. 10 is an enlarged view of the method of manufacturing a speaker diaphragm according to the third embodiment. For convenience of description, a part of the through hole 31 in FIG. 10 is not illustrated. Because the mold 30 according to the third embodiment is similar to that in the method of manufacturing a speaker diaphragm according to the first embodiment, a description about the mold 30 will not be made. Here, a partitioning mold 70 will be described.

The partitioning mold 70 is provided on each of the first mold and the second mold in the vicinity of the inner side surface of the through hole 31. The partitioning mold 70 stops movement of the leaked material 40 in the inner side surface direction of the through hole 31 in the gap portion in the vicinity of the outer side surfaces of the punches P.

When the punches P press the resin layers 22 on the inside of the through hole 31, the leaked material 40 flows in the inner side surface direction of the through hole 31 and move to the gap portion in the vicinity of the outer side surfaces of the punches P. In this case, the partitioning molds 70 are present and thus stop movement of the leaked material 40 in the inner side surface direction of the through hole 31 in the gap portion in the vicinity of the outer side surfaces of the punches P.

Figure 11:
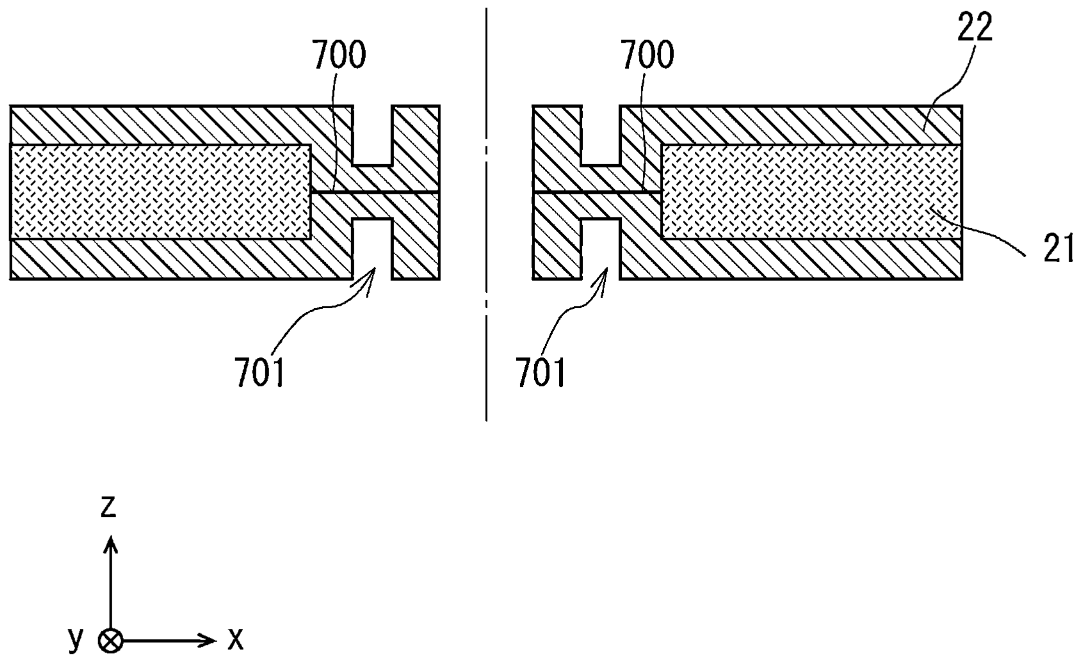
FIG. 11 is a cross-sectional view of the tinsel wire hole 11 in the curved surface 101 of the speaker diaphragm 10 shaped by using the method of manufacturing a speaker diaphragm according to the third embodiment.

FIG. 11 is a cross-sectional view which passes through the tinsel wire hole 11 in the curved surface 101 of the speaker diaphragm 10 shaped by using the method of manufacturing a speaker diaphragm according to the third embodiment. As illustrated in FIG. 11, the resin layers 22 are arranged so as to envelop the conductive layer 21, and fusing surfaces 700 are fused together. In a front surface and a back surface of the curved surface 101, recessed grooves 701 are formed by the partitioning molds 70.

As described above, by using the method of manufacturing a speaker diaphragm according to the third embodiment, the leaked materials produced by the punches are certainly induced to assumed positions. Therefore, the areas of the fusing surfaces become large, and insulation and rigidity are easily secured.

Fourth Embodiment

Figure 12:
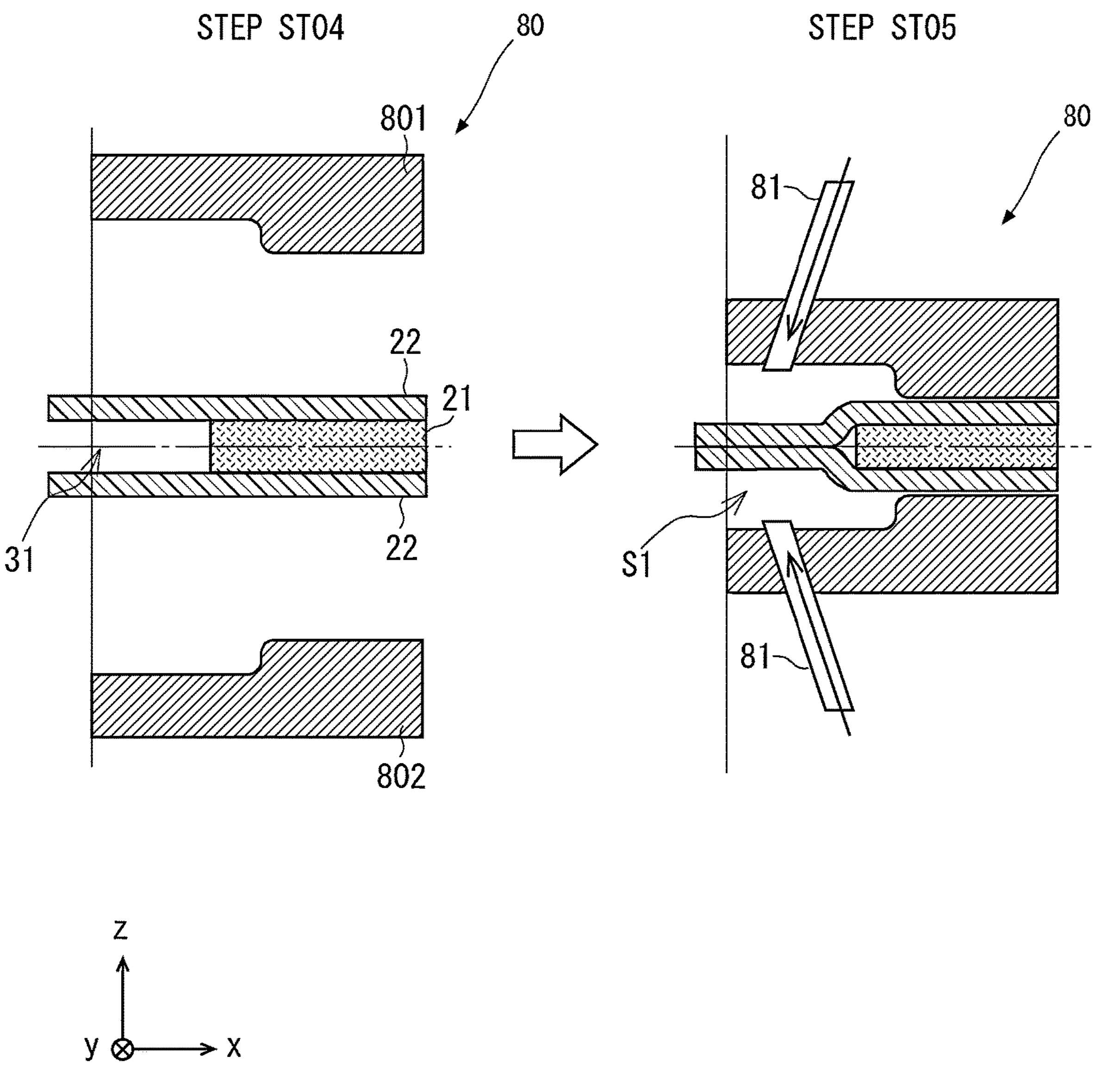
FIG. 12 is an enlarged view of a method of manufacturing a speaker diaphragm according to a fourth embodiment.

A description will be made about a method of manufacturing a speaker diaphragm according to a fourth embodiment. FIG. 12 is an enlarged view of the method of manufacturing a speaker diaphragm according to the fourth embodiment. The method of manufacturing a speaker diaphragm according to the fourth embodiment is different from the method of manufacturing a speaker diaphragm according to the first embodiment in step ST4 and step ST5. Step ST04 and step ST05 in FIG. 12 correspond to step ST4 and step ST5 in FIG. 5. Here, a description will be made about a mold 80, step ST04, and step ST05.

As illustrated in FIG. 12, the mold 80 includes a pair of movable molds 801 and 802 which are capable of being opened and closed. Each of the movable mold 801 and the movable mold 802 has, in a part, a recess which is provided for a predetermined length in a movable direction. In FIG. 12, the movable direction is set as the up-down direction (Z-axis direction). A diameter of the recess in each of the movable mold 801 and the movable mold 802 is larger than the diameter of the through hole 31.

Note that one of the movable molds 801 and 802 may be a fixed mold.

In addition, the movable mold 801 will be referred to as a first mold, and the movable mold 802 will be referred to as a second mold. The movable mold 801 may be used as a second mold, and the movable mold 802 may be used as a first mold.

As illustrated in FIG. 12, the laminated body M1 is arranged in the movable mold 801 and the movable mold 802 (step ST04). The pair of movable molds 801 and 802 are closed, and the resin layers 22 are thereby pressed on the outside of the through hole 31. In this case, the pair of movable molds 801 and 802 are closed, and the recesses of the mold are thereby joined together, and a space S1 is formed. A pressurizing apparatus 81 is inserted into the space S1, and the resin layers 22 on the inside of the through hole 31 are pressurized (step ST05). Accordingly, the resin layers 22 on the inside of the through hole 31 are compressed in a direction of the through hole 31 and are fused together. The pair of movable molds 801 and 802 are opened, and the laminated body M2 whose shape has been formed is taken out.

The pressurizing apparatus 81 is a pressurizing apparatus in which an air gun or a pressurizing tube and a pressurizing pump are combined or a pressurizing apparatus in which an air gun and a compressor are combined.

In the method of manufacturing a speaker diaphragm according to the present fourth embodiment, a step of providing the through hole 31 for causing the tinsel wire to pass through the conductive layer 21 will be referred to as a first step. Further, a step of closing the mold 80 having the recesses, each of which has the diameter larger than the diameter of the through hole 31 and of thereby pressing the resin layers 22 on the outside of the through hole 31 with respect to the laminated body M1 will be referred to as a second step. In addition, a step of pressurizing the space formed by joining of the recesses of the mold 80 in the second step will be referred to as a third step.

As described above, by using the method of manufacturing a speaker diaphragm according to the fourth embodiment, it is not necessary to align positions of through holes which are in advance opened in a conductive material with the mold. Therefore, it becomes easy to secure insulation and rigidity.

Fifth Embodiment

Figure 13:
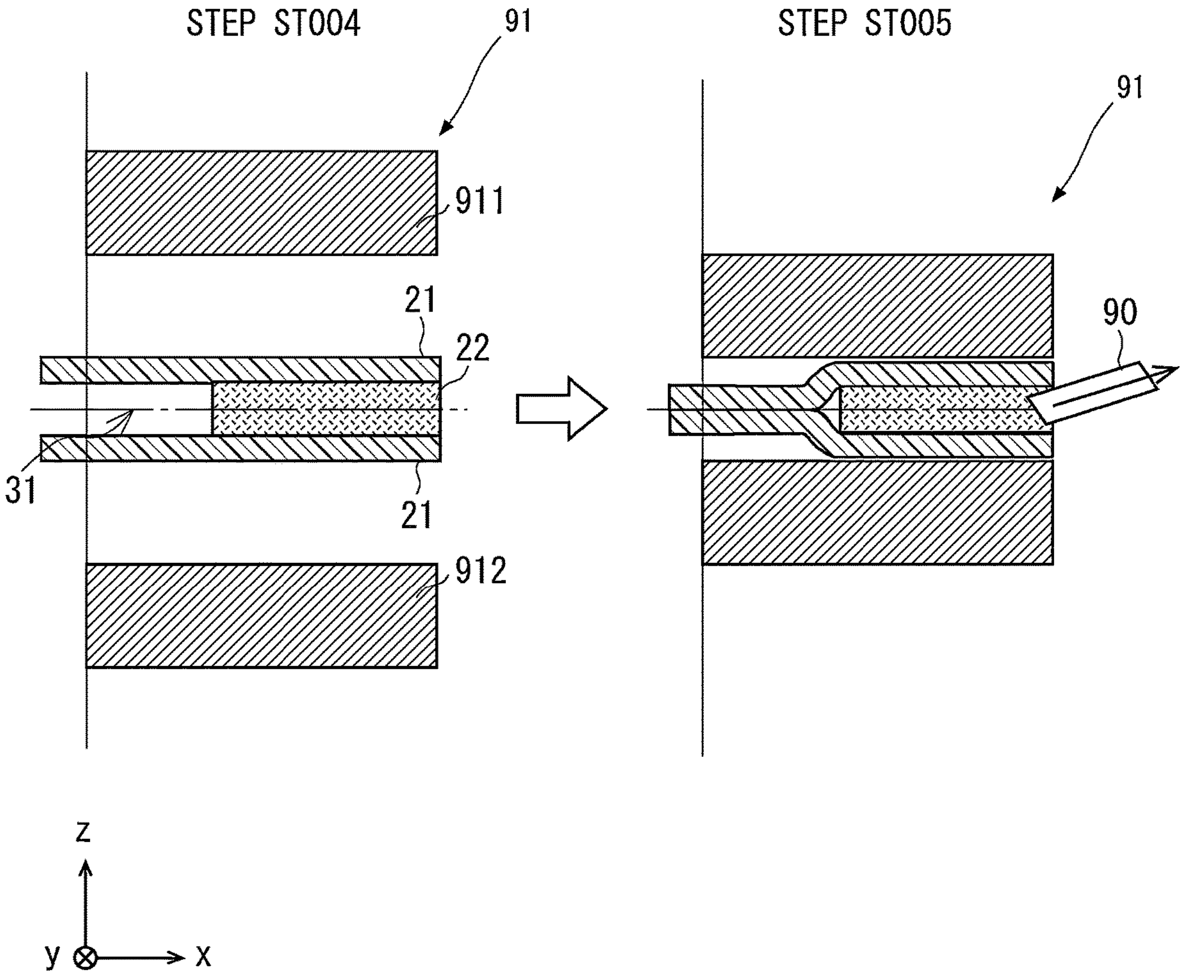
FIG. 13 is an enlarged view of a method of manufacturing a speaker diaphragm according to a fifth embodiment.

A description will be made about a method of manufacturing a speaker diaphragm according to a fifth embodiment. FIG. 13 is an enlarged view of the method of manufacturing a speaker diaphragm according to the fifth embodiment. The method of manufacturing a speaker diaphragm according to the fifth embodiment is different from the method of manufacturing a speaker diaphragm according to the first embodiment in step ST4 and step ST5. Step ST004 and step ST005 in FIG. 13 correspond to step ST4 and step ST5 in FIG. 5. Here, a description will be made about a mold 91, a pressure reduction tube 90, step ST004, and step ST005.

The pressure reduction tube 90 is inserted into the conductive layer 21. Here, the pressure reduction tube 90 is connected with a pressure reduction pump (not illustrated), for example. A combination of the pressure reduction tube 90 and the pressure reduction pump will be denoted as a pressure reduction apparatus. The pressure reduction apparatus is not limited to the combination of the pressure reduction tube and the pressure reduction pump and may be piping and the pressure reduction pump or piping and a vacuum pump.

Because air permeability is secured in the conductive layer 21, pressure reduction is performed by the pressure reduction apparatus. In response to this, the resin layers 22 on the inside of the through hole 31 are compressed in the direction of the through hole 31 and are fused together.

As illustrated in FIG. 13, the mold 91 includes a pair of movable molds 911 and 912 which are capable of being opened and closed. The movable mold 911 and the movable mold 912 may have any shapes as long as those are flat on the outside of the through hole 31. Further, the partitioning mold 70 may be provided in the mold 91.

Note that one of the movable molds 911 and 912 may be a fixed mold.

At the same time as pressing the laminated body M1 by the mold 91, pressure reduction for the conductive layer 21 is performed by the pressure reduction apparatus. Further, the pressure reduction for the conductive layer 21 may be performed while pressing is performed by the other mold 30 at the same time as pressure reduction for the cavity, in which the leaked materials 40 are produced, by another pressure reduction apparatus. In addition, the pressure reduction for the conductive layer 21 may be performed while pressing is performed by the other mold 80 at the same time as pressurization by the pressurizing apparatus 81.

As illustrated in FIG. 13, the laminated body M1 is arranged in the movable mold 911 and the movable mold 912 (step ST004). The pair of movable mold 911 and movable mold 912 are closed, and the laminated body M1 is thereby pressed. At the same time, pressure reduction for the conductive layer 21 is performed by the pressure reduction apparatus (step ST005). Accordingly, the resin layers 22 on the inside of the through hole 31 are compressed in the direction of the through hole 31 and are fused together. The pair of movable molds 911 and 912 are opened, and the laminated body M2 whose shape has been formed is taken out.

In the method of manufacturing a speaker diaphragm according to the present fifth embodiment, a step of fusing the resin layers 22 together on the inside of the through hole 31 by performing pressure reduction for the conductive layer 21 will be referred to as a pressure reduction step.

As described above, by using the method of manufacturing a speaker diaphragm according to the fifth embodiment, it is not necessary to align positions of holes which are in advance opened in the conductive material with the mold. Therefore, it becomes easy to secure insulation and rigidity thereof.

In the speaker diaphragm which is manufactured by using each of the methods of manufacturing a speaker diaphragm according to the above-described first to fifth embodiments and a speaker which uses the speaker diaphragm, insulation and rigidity can be secured.

Note that the present disclosure is not limited to the above embodiments, but can appropriately be changed without departing from the scope of the gist thereof.

The present disclosure is usable for a speaker apparatus and so forth, for example.

What is claimed is:

1. A speaker diaphragm having a through hole through which a tinsel wire is to be inserted, the speaker diaphragm comprising:

a conductive layer having the through hole; and resin layers between which both surfaces of the conductive layer are interposed and which cover an inner side surface of the through hole, wherein a part of the resin layers which covers an inner side surface of the through hole is formed by causing a part of the resin layers, which is positioned around a center of the through hole before a pressing process of pressing a portion around the center of the through hole in the resin layers from the both surfaces of the conductive layer, by a protruding punch having a diameter smaller than a diameter of the through hole, to flow in an inner side surface direction of the through hole by the pressing process.

2. A speaker comprising:

the speaker diaphragm according to claim 1.

* * * * *